United States Patent
Cheng et al.

(10) Patent No.: US 8,804,877 B2
(45) Date of Patent: Aug. 12, 2014

(54) APPARATUS AND METHOD FOR CORRECTING PHASE ERROR

(75) Inventors: Kai-Wen Cheng, Zhubei (TW); Yi-Ying Liao, Taipei (TW); Tung-Sheng Lin, Taoyuan (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/613,207

(22) Filed: Sep. 13, 2012

(65) Prior Publication Data

US 2013/0279554 A1    Oct. 24, 2013

(30) Foreign Application Priority Data

Apr. 24, 2012    (TW) .............................. 101114608 A

(51) Int. Cl.
*H03D 3/22*      (2006.01)

(52) U.S. Cl.
USPC ........... 375/329; 375/346; 375/348; 375/371; 375/373; 375/375; 375/376

(58) Field of Classification Search
USPC .......... 375/329, 346, 348, 371, 373, 375, 376
See application file for complete search history.

(56) References Cited

U.S. PATENT DOCUMENTS

2004/0213170 A1* 10/2004 Bremer ......................... 370/282
2008/0267336 A1* 10/2008 Okamoto ...................... 375/376

* cited by examiner

*Primary Examiner* — Kabir A Timory
(74) *Attorney, Agent, or Firm* — Edell, Shapiro & Finnan LLC

(57) ABSTRACT

An apparatus for correcting a phase error is provided. The apparatus includes an error estimating module and a correcting module. The error estimating module receives a phase-shift keying signal, and calculates a phase error according to the phase-shift keying signal, a plurality of known candidate signals and Bayesian estimation. The correcting module corrects the phase-shift keying signal according to the phase error.

12 Claims, 4 Drawing Sheets

APPARATUS AND METHOD FOR CORRECTING PHASE ERROR

This application claims the benefit of Taiwan application Serial No. 101114608, filed Apr. 24, 2012, the subject matter of which is incorporated herein by reference.

BACKGROUND OF THE INVENTION

1. Field of the Invention

The invention relates in general to a digital communication technique, and more particularly, to a technique for determining a phase error of a communication signal.

2. Description of the Related Art

Phase-shift keying (PSK) is a modulation scheme that conveys data by changing or modulating a phase of a signal. Phase-shift keying is prevalent in the digital communication field as it has high data transmission efficiency. Based on the number of candidate phases in a constellation, phase-shift keying is further categorized into binary phase-shift keying (BPSK), quadrature phase-shift keying (QPSK) and 8-PSK, etc.

For a phase-shift keying communication system, an important task of a receiver is to determine a phase of a currently received signal. The receiver can only retrieve information carried by the received signal after the phase of the received signal is accurately determined. However, in a wireless communication system, interference may be present due to factors such as channel noise and circuit mismatching in the receiver; thus, accurately determining the signal phase has become a great challenge.

SUMMARY OF THE INVENTION

To achieve the above goal, the invention is directed to an apparatus and method for correcting a phase error, in which Bayesian estimation is utilized for minimizing an error between an estimated phase result and a correct phase. Since Bayesian estimation is capable of providing optimized maximum a posteriori (MAP) performance in an additive white Gaussian noise (AWGN) channel, the phase error correcting apparatus and method can accordingly generate a satisfactory phase estimation result. In addition, by selectively decreasing the number of candidate phases, costs and complexities of the phase error correcting apparatus and method can be further reduced.

A phase error correcting apparatus is provided according to one embodiment of the present invention. The phase error correcting apparatus comprises an error estimating module and a correcting module. The error estimating module receives a phase-shift keying signal, and calculates a phase error according to the phase-shift keying signal, a plurality of known candidate signals and Bayesian estimation. The correcting module corrects the phase-shift keying signal according to the phase error.

A phase error correcting method is provided according to another embodiment of the present invention. The method comprises steps of: receiving a phase-shift keying signal; calculating a phase error according to the phase-shift keying signal, a plurality of known candidate signals and Bayesian estimation; and correcting the phase-keying shift signal according to the phase error.

In practice, the apparatus and method for correcting a phase shift can be implemented in not only phase-shift keying digital communication systems but also other types of signal processing systems with a demand of determining a signal phase error, so as to provide satisfactory phase error determination capability.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
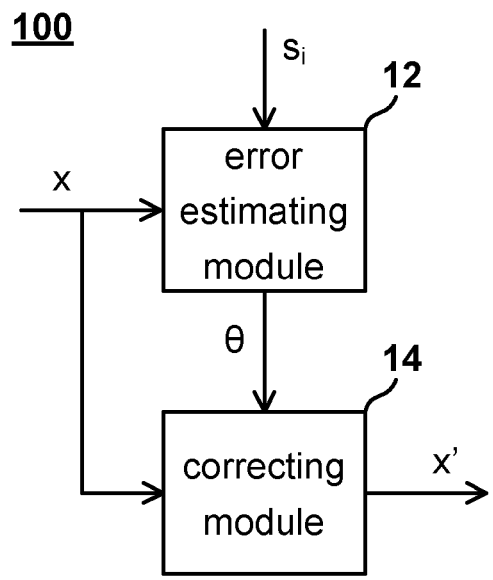
FIG. 1 is a phase error correcting apparatus according to one embodiment of the present invention.

FIG. 1 shows a phase error correcting apparatus 100 according to one embodiment of the present invention. The phase error correcting apparatus 100 comprises an error estimating module 12 and a correcting module 14. In practice, the phase error correcting apparatus 100 may be integrated in various types of digital communication systems adopting phase-shift keying (e.g., DVB-S2 digital television broadcasting systems) or other signal processing systems with a demand of determining a signal phase error. In the description below, a phase-shift keying signal is taken as an example of a signal received by the phase error correcting apparatus 100.

Assuming an original noise-free phase-shift keying signal transmitted from a transmitter is a, a phase-shift keying signal x received by the phase error correcting apparatus 10 is then a sum of the original phase-shift keying signal a and Gaussian noise n: x=a+n. A difference between an estimation result 'â' generated for the original phase-shift keying signal 'a' by the phase error correcting apparatus 100 and the original phase-shift keying signal a is denoted as $\epsilon$. In this embodiment, the phase error correcting apparatus 100 adopts the square of the difference $\epsilon$ as a quadratic cost function $C(\epsilon)$, and utilizes an expected value of the function $C(\epsilon)$ as a Bayesian risk R:

$$R = E[C(\epsilon)] = E[\epsilon^2] = E[(\hat{a}-a)^2]$$

The original signal a is a phase-shift keying signal, meaning that it is one of a plurality of known candidate signals $s_i$. Taking quadrature phase-shift keying (QPSK) as an example, the number of candidate signals $s_i$ is four, which are respectively 45-degree, 135-degree, 225-degree and 315-degree signals. The candidate signals $s_i$ are also known to the phase error correcting apparatus 100. A main goal of the phase error correcting apparatus 100 is to identify the estimation result 'â' corresponding to 'a' minimized Bayesian risk R from the candidate signals $s_i$, that is, to identify the estimation result â having the minimum error $\epsilon$, so that the estimation result a can be closest to the original phase-shift keying signal 'a'.

According to the definition of expected value, the above formula can be rewritten as:

$$E[(\hat{a}-a)^2 \mid x] = \int\int (\hat{a}-a)^2 Pr(a,x) da\, dx$$

$$= \int\left[\int (\hat{a}-a)^2 Pr(a\mid x) da\right] Pr(x) dx$$

By partially differentiating the above formula, an equation below can be derived:

$$\frac{\partial}{\partial \hat{a}} E[(\hat{a}-a)^2 \mid x] = \frac{\partial}{\partial \hat{a}} \int (\hat{a}-a)^2 Pr(a\mid x) da$$

$$= \int \frac{\partial}{\partial \hat{a}} (\hat{a}-a)^2 Pr(a\mid x) da$$

$$= \int 2(\hat{a}-a) Pr(a\mid x) da$$

$$= 2\hat{a}\int Pr(a\mid x) da - 2\int a Pr(a\mid x) da$$

It is known from the above equations that, the optimized estimation result â capable of minimizing the Bayesian risk R is a conditional mean.

$$\hat{a} = \int a Pr(a\mid x) da = E[a\mid x]$$

According to the definition of expected value, by respectively multiplying the candidate signals with a probability of occurrence, the above formula can be rewritten as:

$$\hat{a} = E[a\mid x] = \sum_{i\in\Omega} s_i Pr(a=s_i\mid x)$$

By expanding the above formula based on the Bayesian theorem, a formula below is obtained:

$$\hat{a} = \sum_{i\in\Omega} s_i \frac{Pr(x\mid s_i)\cdot Pr(s_i)}{Pr(x)}$$

$$= \sum_{i\in\Omega} s_i \frac{Pr(x\mid s_i)\cdot Pr(s_i)}{\sum_{j\in\Omega} Pr(x\mid s_j)\cdot Pr(s_j)}$$

Assuming that the probabilities of the original signal 'a' being equal to any of the candidate signals $s_i$ are the same, the above formula can be further simplified as:

$$\hat{a} = \sum_{i\in\Omega} s_i \frac{Pr(x\mid s_i)}{\sum_{j\in\Omega} Pr(x\mid s_j)}$$

Assuming that the foregoing phase-shift keying signal x is transmitted to the phase error correcting apparatus 100 through an AWGN channel, and a symbol σ represents a noise variance of the AWGN channel, the above formula can be rewritten as:

$$\hat{a} = \sum_{i\in\Omega} s_i \frac{e^{-\frac{\|x-s_i\|^2}{2\sigma^2}}}{\sum_{j\in\Omega} e^{-\frac{\|x-s_j\|^2}{2\sigma^2}}}$$

Assuming that an energy of the phase-shift keying signal x is a fixed value when the phase-shift keying signal x is inputted into the phase error correcting apparatus 100, the above formula can be rewritten as:

$$\hat{a} = \sum_{i\in\Omega} s_i \frac{e^{\frac{Re(x*s_i)}{\sigma^2}}}{\sum_{j\in\Omega} e^{\frac{Re(x*s_j)}{\sigma^2}}}$$

The phase difference between the phase-shift keying signal x and the estimation result â capable of minimizing the Bayesian risk R, i.e., the phase error θ between the phase-shift keying signal and the estimation result a capable of minimizing the Bayesian risk R, is defined as:

$$\theta = \arg\{x\cdot \hat{a}^*\} = \tan^{-1}\left\{\frac{\mathrm{Im}\{x\cdot \hat{a}^*\}}{\mathrm{Re}\{x\cdot \hat{a}^*\}}\right\}$$

By substituting the obtained estimation result a into the above, the above formula can be rewritten as:

$$\theta = \tan^{-1}\left\{\frac{\mathrm{Im}\left\{x\cdot\left[\sum_{i\in\Omega} s_i\cdot e^{-\frac{\|x-s_i\|^2}{2\sigma^2}}\right]^*\right\}}{\mathrm{Re}\left\{x\cdot\left[\sum_{i\in\Omega} s_i\cdot e^{-\frac{\|x-s_i\|^2}{2\sigma^2}}\right]^*\right\}}\right\}, \text{ or}$$

$$\theta = \tan^{-1}\left\{\frac{\mathrm{Im}\left\{x\cdot\left[\sum_{i\in\Omega} s_i\cdot e^{\frac{Re\{x^*s_i\}}{\sigma^2}}\right]^*\right\}}{\mathrm{Re}\left\{x\cdot\left[\sum_{i\in\Omega} s_i\cdot e^{\frac{Re\{x^*s_i\}}{\sigma^2}}\right]^*\right\}}\right\}$$

In this embodiment, after receiving the phase-shift keying signal x, the error estimating module 12 calculates the phase error θ according to the phase-shift keying signal x and the plurality of candidate signals $s_i$, using one of the above two formulas. The correcting module 14 then corrects the phase-shift keying signal x according to the phase error θ generated by the error estimating module 12. In practice, the correcting module 14 may be implemented by a phase derotator. As previously stated, the estimation result a can render the minimized Bayesian risk R. Therefore, by correcting the phase-shift keying signal x to equal to or close to the estimation result a according to the phase error θ, the phase difference between the corrected phase-shift keying signal x' and the original phase-shift keying signal a can be reduced or minimized.

In another embodiment, the error estimating module 12 may be designed to omit the arctan calculation in the above formulas to directly calculate the phase error θ according to one of the two formulas below:

$$\theta = \frac{\text{Im}\left\{x \cdot \left[\sum_{i \in \Omega} s_i \cdot e^{-\frac{\|x-s_i\|^2}{2\sigma^2}}\right]^*\right\}}{\text{Re}\left\{x \cdot \left[\sum_{i \in \Omega} s_i \cdot e^{-\frac{\|x-s_i\|^2}{2\sigma^2}}\right]^*\right\}}, \text{ and}$$

$$\theta = \frac{\text{Im}\left\{x \cdot \left[\sum_{i \in \Omega} s_i \cdot e^{\frac{\text{Re}\{x^* s_i\}}{\sigma^2}}\right]^*\right\}}{\text{Re}\left\{x \cdot \left[\sum_{i \in \Omega} s_i \cdot e^{\frac{\text{Re}\{x^* s_i\}}{\sigma^2}}\right]^*\right\}}$$

When the phase error θ is relatively small (e.g., smaller than 5 degrees), tan θ and θ are almost equal to each other, and so the error estimating module 12 can still obtain a quite accurate result according to the simplified formulas. In other words, when the phase difference between the phase-shift keying signal x and the estimation result â is not too large, the simplified formulas are feasible while hardware circuit complexities in the error estimating module 12 can be reduced.

Figure 2A:
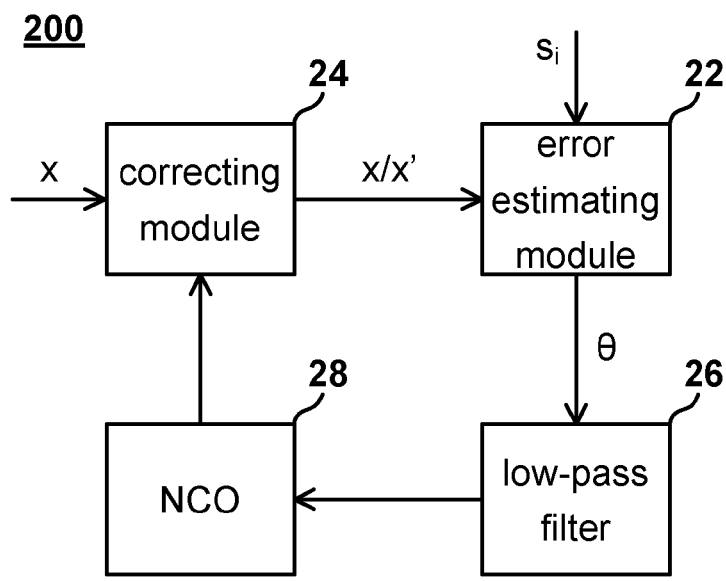
FIGS. 2A and 2B are block diagrams of a phase error correcting apparatus according to other embodiments of the present invention.

FIG. 2A shows a phase error correcting apparatus 200 according to another embodiment of the present invention. In addition to an error estimating module 22 and a correcting module 24, the phase error correcting apparatus 200 further comprises a low-pass filter 26 and a numerically-controlled oscillator (NCO) 28. In practice, the error estimating module 22, the low-pass filter 26 and the NCO 28 may be combined to be a phase-locked loop (PLL). The low-pass filter 26 removes a high-frequency component from the phase error θ to generate a filtered result. The NCO 28 subsequently generates an output signal according to the filtered result to control the correcting module 24 to adjust the phase of the phase-shift keying signal x.

Before the error estimating module 22 performs phase error estimation on the phase-shift keying signal x for the first time (i.e., before the corrected phase-shift keying signal x' is generated), the correcting module 24 may transmit the phase-shift keying signal x to the error estimating module 22. It should be noted that, the error estimating module 22 in this embodiment adopts the above simplified formulas to calculate the phase error θ.

As previously described, given that the phase difference between the phase-shift keying signal x and the estimation result â is not too large, the phase error θ generated by the error estimating module 22 equals the phase difference. In contrast, when the phase difference between the phase-shift keying signal x and the estimation result â is rather large, the phase error θ generated by the error estimating module 22 does not equal the phase difference. Theoretically, the positive and negative signs of the phase error θ generated by the error estimating module 22 are correct (i.e., the phase error θ and the phase difference have the same positive/negative sign). After undergoing one or multiple correction, the corrected phase-shift keying signal x' provided to the error estimating module 22 to the correcting module 24 approaches the estimation result a capable of minimizing the Bayesian risk R.

Figure 2B:
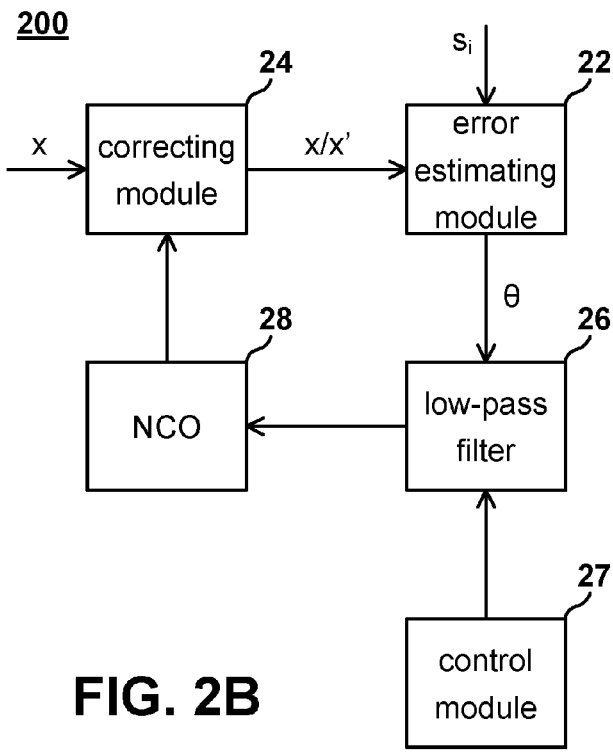

Referring to FIG. 2B, the phase error correcting apparatus 200 further comprises a control module 27 for adjusting the low-pass filter 26. In general, phase errors come from thermal noise and phase noise. When the thermal noise is large, a response speed of the low-pass filter 26 can be lowered to prevent the PLL from becoming unstable due to drastic phase changes. On the other hand, when the phase noise is large, the response speed of the low-pass filter 26 may be increased to catch up with the phase change.

Therefore, in practice, the control module 27 may be designed to increase the response time of the low-pass filter 26 when a thermal noise index gets higher than a first threshold, and to increase the response speed of the low-pass filter when a phase noise index becomes higher than a second threshold, thereby maintaining optimal system performance by adaptively adjusting the low-pass filter 26.

Figure 3A:
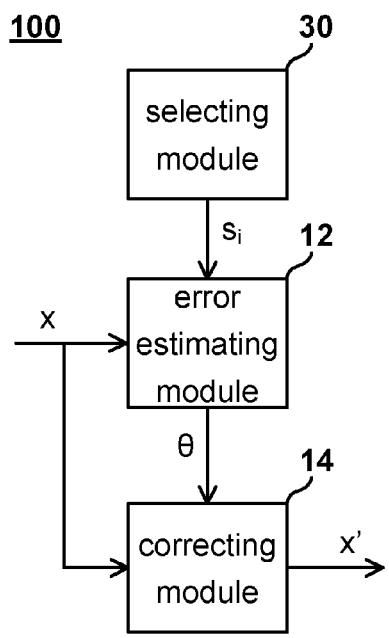
FIGS. 3A and 3B are block diagrams of a phase error correcting apparatus further comprising a selecting module according to other embodiments of the present invention.
Figure 3B:
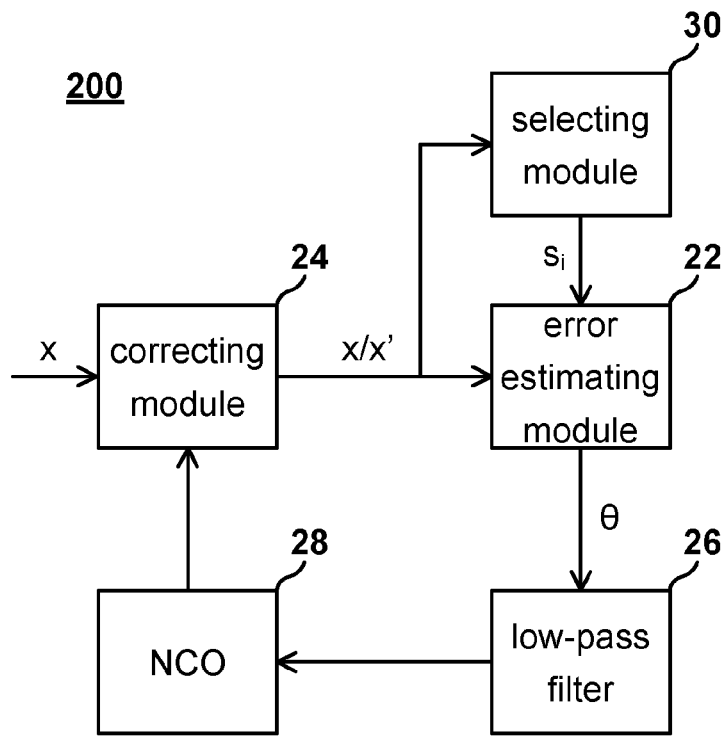

Referring to FIGS. 3A and 3B, the foregoing phase error correcting apparatuses 100 and 200 may further comprise a selecting module 30. For example, the selecting module 30 can be a hard slicer. According to the phase-shift keying signal x, the selecting module 30 selects a plurality of candidate signals $s_i$ that are closer to the phase-shift keying signal x from a plurality of original candidate signals, and provides the selected candidate signals $s_i$ to the error estimating module 22 for calculating the phase error θ.

Figure 4:
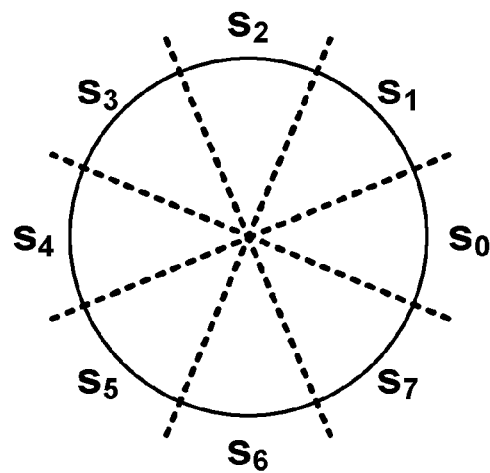
FIG. 4 is an example of an 8-PSK phase constellation.

Taking an 8-PSK phase constellation in FIG. 4 as an example, if the selecting module 30 preliminarily determines that the phase of the phase-shift keying signal x falls within an interval corresponding to a candidate signal $s_0$, the selecting module 30 may suggest the error estimating module 22 to consider only the candidate signal $s_0$ and neighboring signals $s_1$ and $s_7$ when calculating the phase error θ. Unless a ratio of the noise in the channel is extremely high, the probability that the original phase-shift keying signal a equals the candidate signals $s_2$ and $s_6$ is very low, and so the candidate signals $s_2$ and $s_6$ can then be eliminated. By reducing the number of the candidate signals $s_i$, the procedure for calculating the phase error θ can be further simplified and accelerated.

It should be noted that the number of candidate signals provided to the error estimating module 22 by the selecting module 30 is not limited to three. In addition, even after the corrected phase-shift keying signal x', of which phase is not entirely "locked", is generated, the selecting module 30 may keep or select again the candidate signal $s_i$ provided to the error estimating module 22 according to the corrected phase-shift keying signal x'.

Figure 5:
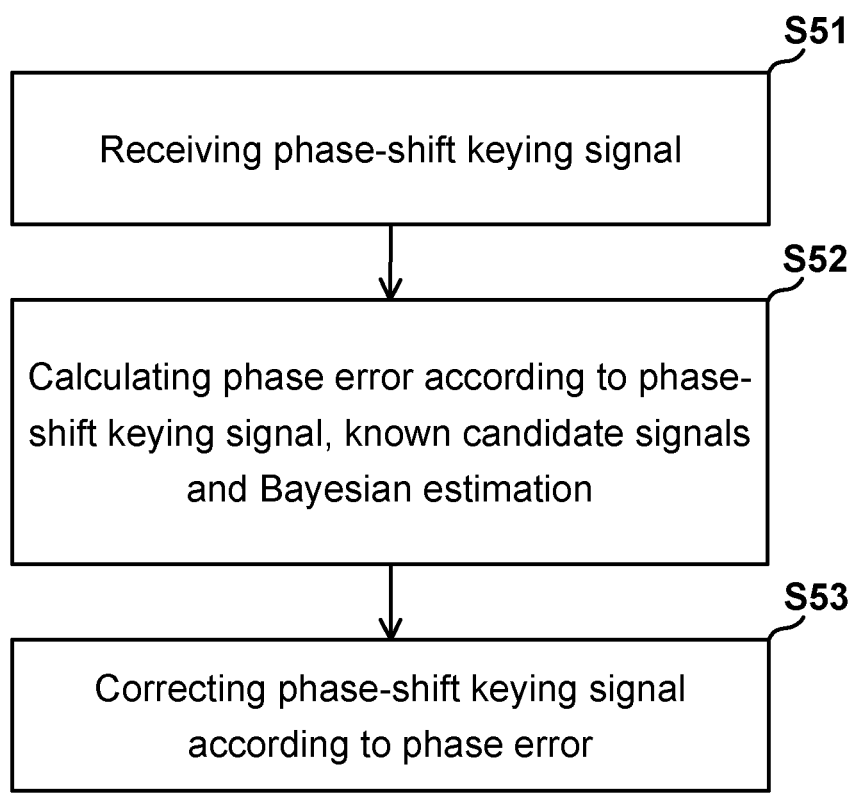
FIG. 5 is a flowchart of a phase error correcting method according to one embodiment of the present invention.

FIG. 5 shows a flowchart of a signal processing method according to another embodiment of the present invention. Referring to FIG. 5, in Step S51, a phase-shift keying signal is received. In Step S52, a phase error is calculated according to the phase-shift keying signal, a plurality of known candidate signals and Bayesian estimation. In Step S53, the phase-shift keying signal is corrected according to the phase error. Details of the signal processing method are as discussed in related descriptions of the phase error correcting apparatus 100 and 200 in the foregoing embodiments, and shall be omitted herein.

Therefore, an apparatus and method for correcting a phase error is provided by the embodiment of the present invention. In the phase error correcting apparatus and method, Bayesian estimation is adopted for minimizing an error between an estimated phase result and a correct phase. Since Bayesian estimation is capable of providing optimized MAP performance in an AWGN channel, the phase error correcting apparatus and method can accordingly generate a satisfactory phase estimation result. In addition, by selectively decreasing the number of candidate phases, costs and complexities of the phase error correcting apparatus and method can be further reduced.

It should be noted that, the phase error correcting apparatus of the present invention may also adopt other types of Bayesian cost functions as calculation basis for estimating the phase error instead of using the quadratic cost function. In addition, the phase error correcting apparatus and method can be implemented in not only phase-shift keying digital communication systems but also other types of signal processing systems with a demand of determining a signal phase error, so as to provide satisfactory phase error determination.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A phase error correcting apparatus, applied to a phase-shift keying communication system, the apparatus comprising:

an error estimating module, for receiving a phase-shift keying signal comprising an original signal and a noise signal, and calculating a phase error caused by the noise signal according to the phase-shift keying signal and a plurality of candidate signals using Bayesian estimation; wherein the original signal represents one of the plurality of candidate signals; and a correcting module, for correcting the phase-shift keying signal according to the phase error, wherein the error estimating module associates a quadratic of a difference of the original signal and an estimated signal corresponding to the phase-shift keying signal to a Bayesian risk, and calculates the phase error toward minimizing the Bayesian risk, in a way that a phase difference of the corrected phase-shift keying signal and the original signal is minimized.

2. The apparatus according to claim 1, wherein the error estimating module calculates the phase error θ according to one of two formulas:

$$\theta = \tan^{-1}\left\{\frac{\operatorname{Im}\left\{x \cdot \left[\sum_{i \in \Omega} s_i \cdot e^{-\frac{\|x-s_i\|^2}{2\sigma^2}}\right]^*\right\}}{\operatorname{Re}\left\{x \cdot \left[\sum_{i \in \Omega} s_i \cdot e^{-\frac{\|x-s_i\|^2}{2\sigma^2}}\right]^*\right\}}\right\}, \text{ and}$$

$$\theta = \tan^{-1}\left\{\frac{\operatorname{Im}\left\{x \cdot \left[\sum_{i \in \Omega} s_i \cdot e^{\frac{\operatorname{Re}[x^* s_i]}{\sigma^2}}\right]^*\right\}}{\operatorname{Re}\left\{x \cdot \left[\sum_{i \in \Omega} s_i \cdot e^{\frac{\operatorname{Re}[x^* s_i]}{\sigma^2}}\right]^*\right\}}\right\};$$

where x represents the phase-shifted keying signal, $s_i$ represents the candidate signals, σ represents a noise variance of an additive white Gaussian noise (AWGN) channel.

3. The apparatus according to claim 1, wherein the error estimating module calculates the phase error θ according to one of two formulas:

$$\theta = \frac{\operatorname{Im}\left\{x \cdot \left[\sum_{i \in \Omega} s_i \cdot e^{-\frac{\|x-s_i\|^2}{2\sigma^2}}\right]^*\right\}}{\operatorname{Re}\left\{x \cdot \left[\sum_{i \in \Omega} s_i \cdot e^{-\frac{\|x-s_i\|^2}{2\sigma^2}}\right]^*\right\}}, \text{ and}$$

$$\theta = \frac{\operatorname{Im}\left\{x \cdot \left[\sum_{i \in \Omega} s_i \cdot e^{\frac{\operatorname{Re}[x^* s_i]}{\sigma^2}}\right]^*\right\}}{\operatorname{Re}\left\{x \cdot \left[\sum_{i \in \Omega} s_i \cdot e^{\frac{\operatorname{Re}[x^* s_i]}{\sigma^2}}\right]^*\right\}};$$

where x represents the phase-shifted keying signal, $s_i$ represents the candidate signals, σ represents a noise variance of an AWGN channel.

4. The apparatus according to claim 3, further comprising:

a low-pass filter, for filtering the phase error to generate a filtered result; and a numerically-controlled oscillator (NCO), for generating an output signal according to the filtered result for the correcting module to adjust a phase of the phase-shift keying signal.

5. The apparatus according to claim 4, further comprising:

a control module, for adjusting the low-pass filter;

wherein, when the control module determines a thermal noise index is higher than a first threshold, the control module lowers a response speed of the low-pass filter; and when the control module determines a phase noise index is higher than a second threshold, the control module raises the response speed of the low-pass filter.

6. The apparatus according to claim 1, further comprising:

a selecting module, for selecting the plurality of candidate signals for the error estimating module according to the phase-shift keying signal.

7. A phase error correcting method, applicable to a phase-shift keying communication system, the method comprising:

a) receiving a phase-shift keying signal comprising an original signal and a noise signal;

b) calculating a phase error caused by the noise according to the phase-shift keying signal and a plurality of candidate signals using Bayesian estimation, wherein the original signal represents one of the candidate signals; and c) correcting the phase-shift keying signal according to the phase error, wherein step (b) comprises associating a quadratic of a difference of the original signal and an estimated signal corresponding to the phase-shift keying signal to a Bayesian risk, and calculating the phase error toward minimizing the Bayesian risk, in a way that a phase difference of the corrected phase-shift keying signal and the original signal is minimized.

8. The method according to claim 7, wherein step (b) comprises calculating the phase error θ according to one of two formulas:

$$\theta = \tan^{-1}\left\{\frac{\operatorname{Im}\left\{x \cdot \left[\sum_{i \in \Omega} s_i \cdot e^{-\frac{\|x-s_i\|^2}{2\sigma^2}}\right]^*\right\}}{\operatorname{Re}\left\{x \cdot \left[\sum_{i \in \Omega} s_i \cdot e^{-\frac{\|x-s_i\|^2}{2\sigma^2}}\right]^*\right\}}\right\}, \text{ and}$$

$$\theta = \tan^{-1}\left\{\frac{\operatorname{Im}\left\{x \cdot \left[\sum_{i \in \Omega} s_i \cdot e^{\frac{Re\{x^* s_i\}}{\sigma^2}}\right]^*\right\}}{\operatorname{Re}\left\{x \cdot \left[\sum_{i \in \Omega} s_i \cdot e^{\frac{Re\{x^* s_i\}}{\sigma^2}}\right]^*\right\}}\right\};$$

where x represents the phase-shifted keying signal, $s_i$ represents the candidate signals, σ represents a noise variance of an AWGN channel.

9. The method according to claim 7, wherein step (b) comprises calculating the phase error θ according to one of two formulas:

$$\theta = \frac{\operatorname{Im}\left\{x \cdot \left[\sum_{i \in \Omega} s_i \cdot e^{-\frac{\|x-s_i\|^2}{2\sigma^2}}\right]^*\right\}}{\operatorname{Re}\left\{x \cdot \left[\sum_{i \in \Omega} s_i \cdot e^{-\frac{\|x-s_i\|^2}{2\sigma^2}}\right]^*\right\}}, \text{ and}$$

$$\theta = \frac{\operatorname{Im}\left\{x \cdot \left[\sum_{i \in \Omega} s_i \cdot e^{\frac{Re\{x^* s_i\}}{\sigma^2}}\right]^*\right\}}{\operatorname{Re}\left\{x \cdot \left[\sum_{i \in \Omega} s_i \cdot e^{\frac{Re\{x^* s_i\}}{\sigma^2}}\right]^*\right\}};$$

where x represents the phase-shifted keying signal, $s_i$ represents the candidate signals, σ represents a noise variance of an AWGN channel.

10. The method according to claim 9, wherein step (c) comprises:
   low-pass filtering the phase error to generate a filtered result; and
   generating an output signal according to the filtered result for adjusting a phase of the phase-shift keying signal.

11. The method according to claim 10, further comprising:
   when determining that a thermal noise index is higher than a first threshold, lowering a response speed of the low-pass filter; and
   when determining that a phase noise index is higher than a second threshold, raising the response speed of the low-pass filter.

12. The method according to claim 7, further comprising:
   selecting the plurality of candidate signals according to the phase-shift keying signal for use of step (b).

\* \* \* \* \*